United States Patent
Cosatto

(10) Patent No.: US 12,106,550 B2
(45) Date of Patent: Oct. 1, 2024

(54) CELL NUCLEI CLASSIFICATION WITH ARTIFACT AREA AVOIDANCE

(71) Applicant: NEC Laboratories America, Inc., Princeton, NJ (US)

(72) Inventor: Eric Cosatto, Red Bank, NJ (US)

(73) Assignee: NEC Corporation, Tokyo (JP)

( * ) Notice: Subject to any disclaimer, the term of this patent is extended or adjusted under 35 U.S.C. 154(b) by 350 days.

(21) Appl. No.: 17/711,546

(22) Filed: Apr. 1, 2022

(65) Prior Publication Data

US 2022/0319158 A1 Oct. 6, 2022

Related U.S. Application Data

(60) Provisional application No. 63/170,677, filed on Apr. 5, 2021.

(51) Int. Cl.
*G06V 10/774* (2022.01)
*G06V 10/82* (2022.01)
*G06V 10/98* (2022.01)
*G06V 20/69* (2022.01)

(52) U.S. Cl.
CPC .......... *G06V 10/7753* (2022.01); *G06V 10/82* (2022.01); *G06V 10/98* (2022.01); *G06V 20/69* (2022.01); *G06V 20/698* (2022.01); *G06V 2201/03* (2022.01)

(58) Field of Classification Search
CPC ............... G06V 10/98; G06V 10/993; G06V 20/69–698; G06V 2201/03; G06V 10/82; G06V 10/7753; G06N 3/02–0985; G06T 2207/20084; G06T 2207/20081; G06T 7/0012; G06T 2207/10056; G06T 2207/30004; G06T 2207/30024; G06T 5/00; G06T 5/60; G06T 5/73–77
See application file for complete search history.

(56) References Cited

U.S. PATENT DOCUMENTS

| | | | |
|---|---|---|---|
| 2018/0182099 A1* | 6/2018 | Lesniak | G06V 10/993 |
| 2019/0147588 A1* | 5/2019 | Rowley Grant | G06T 7/0012 382/131 |
| 2019/0294923 A1* | 9/2019 | Riley | G06V 10/764 |
| 2021/0090250 A1* | 3/2021 | Soans | G06V 10/82 |
| 2021/0192730 A1* | 6/2021 | Raciti | G06V 10/776 |

(Continued)

OTHER PUBLICATIONS

Kohlberger, Timo, et al. "Whole-slide image focus quality: Automatic assessment and impact on ai cancer detection." Journal of pathology informatics 10.1 (2019): 39. (Year: 2019).*

(Continued)

*Primary Examiner* — Geoffrey E Summers
(74) *Attorney, Agent, or Firm* — Joseph Kolodka

(57) ABSTRACT

Methods and systems for training a neural network model include augmenting an original training dataset to generate an augmented training dataset, by applying an image artifact to a portion of an original image of the original dataset to generate an artifact image. A target image is generated corresponding to the artifact image by deleting labels from the target image at the position of the artifact. A neural network model is trained using the augmented training dataset and the corresponding target image, the neural network model including a first output that identifies artifact regions and other outputs identifying objects.

16 Claims, 8 Drawing Sheets

(56) References Cited

U.S. PATENT DOCUMENTS

| | | | |
|---|---|---|---|
| 2021/0201474 A1* | 7/2021 | Sharma | G06T 7/579 |
| 2022/0122244 A1* | 4/2022 | Lee | G06T 7/0002 |
| 2022/0260825 A1* | 8/2022 | Grunkin | G06V 20/69 |

OTHER PUBLICATIONS

Valente, Augusto C., et al. "Print Defect Mapping with Semantic Segmentation." 2020 IEEE Winter Conference on Applications of Computer Vision (WACV). IEEE, 2020. (Year: 2020).*

Cho, Kyung-Ok, Sung Hak Lee, and Hyun-Jong Jang. "Feasibility of fully automated classification of whole slide images based on deep learning." The Korean Journal of Physiology & Pharmacology: Official Journal of the Korean Physiological Society and the Korean Society of Pharmacology 24.1 (2020): 89. (Year: 2020).*

Van Zon, Mike, et al. "Segmentation and classification of melanoma and nevus in whole slide images." 2020 IEEE 17th International Symposium on Biomedical Imaging (ISBI). IEEE, 2020. (Year: 2020).*

Ruder, Sebastian. "An overview of multi-task learning in deep neural networks." arXiv preprint arXiv:1706.05098v1 (2017). (Year: 2017).*

Senaras et al., "DeepFocus: detection of out-of-focus regions in whole slide digital images using deep learning", PloS one, Oct. 25, 2018, pp. 1-13.

* cited by examiner

CELL NUCLEI CLASSIFICATION WITH ARTIFACT AREA AVOIDANCE

RELATED APPLICATION INFORMATION

This application claims priority to U.S. Patent Application No. 63/170,677, filed on Apr. 5, 2021, incorporated herein by reference in its entirety.

BACKGROUND

Technical Field

The present invention relates to tumor cell detection and classification, and, more particularly, training a machine learning model to identify areas of tissue images that include artifacts.

Description of the Related Art

Obtaining a tumor cell ratio, which is a measure of cancer aggressiveness, includes counting a number of cells in the tumor area. For some tissue samples, the number of cells can be in the millions. However image artifacts, such as inked areas, blurry areas, tissue folds, and overstained areas, can impair cell classification.

SUMMARY

A method for training a neural network model includes augmenting an original training dataset to generate an augmented training dataset, by applying an image artifact to a portion of an original image of the original dataset to generate an artifact image. A target image is generated corresponding to the artifact image by deleting labels from the target image at the position of the artifact. A neural network model is trained using the augmented training dataset and the corresponding target image, the neural network model including a first output that identifies artifact regions and other outputs identifying objects.

A method for analyzing a tissue sample includes analyzing a tissue sample image using a neural network model that includes a first output that identifies cells, a second output that identifies tumor cells, and a third output that identifies an artifact region. A corrective action is performed, responsive to the determination that the proportion of the tissue sample image within the one or more detected artifact regions exceeds a threshold, to generate a corrected tissue sample image. An analysis of the corrected tissue sample image is performed.

A system for training a neural network model includes a hardware processor and a memory that stores a computer program. When executed by the hardware processor, the computer program causes the hardware processor to augment an original training dataset to generate an augmented training dataset, by applying an image artifact to a portion of an original image of the original dataset to generate an artifact image, to generate a target image corresponding to the artifact image by deleting labels from the target image at the position of the artifact, and to train a neural network model using the augmented training dataset and the corresponding target image, the neural network model including a first output that identifies artifact regions and other outputs identifying objects.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To identify a tumor cell ratio (TCR), normal and tumor cells may be automatically counted for a given area of a tissue sample. High-magnification images may be used to show details of individual cells, while lower-magnification images reveal how cells are arranged in larger structures, such as glands. Cancerous cells can be contrasted from healthy cells by their individual cell features, by the way they arrange themselves, or both.

However, the slide may include areas where TCR calculations should be avoided, for example in the case where the slide includes areas with artifacts. When these artifact areas occupy too much of the slide area, the slide may need to be re-scanned or replaced. Such areas can be detected using a machine learning model that is trained to identify artifacts along with cell identification and classification functions. This can provide an indication of the quality of the slide, which can be used to determine how trustworthy the slide analysis results may be.

The machine learning model may include a convolutional neural network, with multiple output layers that perform different classification tasks. For example, three distinct output layers may be used—one to identify the locations of all nuclei, one to specifically identify tumor nuclei, and one to identify artifact areas. A loss function may be used to train the machine learning model in a manner that ensures that the artifact detection does not overwhelm the other output layers, for example as a weighted sum of the individual output layer losses.

The machine learning model may be trained using a dataset that has been augmented to include artifact information. For example, starting from an original training dataset that includes images with labeled cells and tumor cells, augmented training samples can be introduced that add an artifact to an original training sample. This may be done by, e.g., adding a blur or color shift to the original training sample. To ensure that the machine learning model correctly learns boundaries between artifact areas and normal areas, the modifications may not be made to the entire original training sample, but instead may be made based on a randomly generated mask. Nuclei labels may be removed from artifact areas in the augmented samples to prevent nuclei from being detected in those areas.

Figure 1:
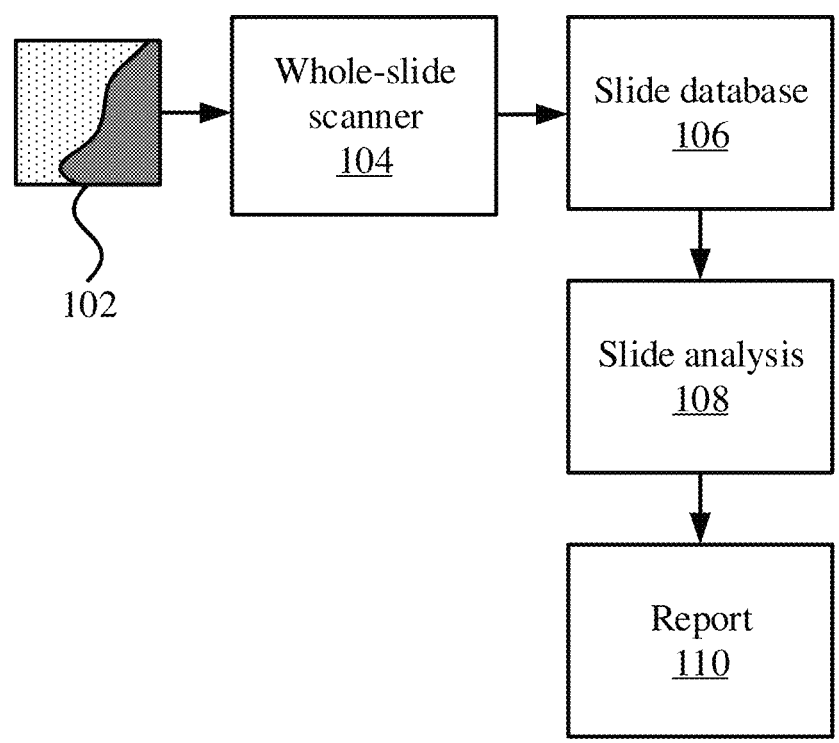
FIG. 1 is a block diagram of a slide analysis system that can identify and exclude artifact regions of a scanned slide image, in accordance with an embodiment of the present invention.

Referring now in detail to the figures in which like numerals represent the same or similar elements and initially to FIG. 1, a system for analyzing tissue samples and providing TCR reports is shown. A tissue sample 102 is taken and put on a slide. The slide may be scanned by a whole-slide scanner 104, producing a slide image, which is stored in a slide database 106.

Slide analysis 108 may split each image into processing tiles, which may be performed according to a regular grid and/or may be determined according to a user's indication of sections of the slide image to focus on. The slide analysis 108 may generate a report 110 that characterizes the information gleaned from the slide 102, for example including TCR, locations of cancerous cells, etc. This report 110 may be used by medical professionals to help diagnose a patient, to identify a type and extent of a cancer, to identify an area on the tissue that is amenable for genetic tests, to identify a course of treatment, etc.

As described herein, slide analysis 108 may include identification of portions of the slide image that include artifacts, such as inked areas, blurry areas, tissue folds, or overstained areas. These areas may need to be excluded from the determination of the report 110, and may prompt the re-scanning or replacement of the tissue sample 102 if the artifact areas occupy more than a threshold amount of the slide image.

Figure 2:
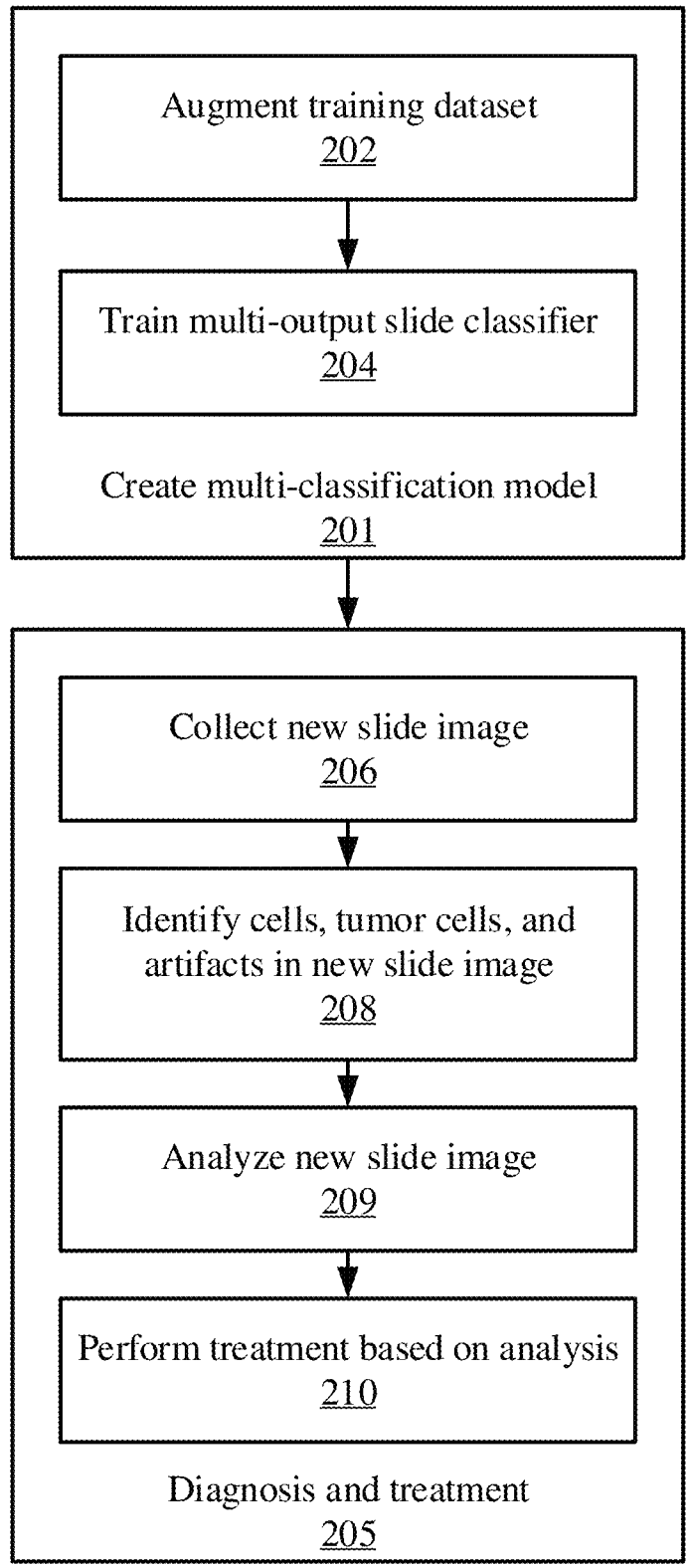
FIG. 2 is a block/flow diagram of a method for diagnosis and treatment based on a scanned slide image using analysis that can identify and exclude artifact regions of the scanned slide image, in accordance with an embodiment of the present invention.

Referring now to FIG. 2, a method for performing analysis of a tissue sample is shown. Two phases are shown, including the creation of a multi-classification model in block 201 and diagnosis and treatment in block 205. These two phases may be performed at separate times, in separate places. For example, the creation of the multi-classification model in block 201 may be performed well in advance, with the trained model being distributed for use in hospitals and research centers. The diagnosis and treatment in block 205 may be performed using a pre-trained model, based on tissue samples recently collected from a patient. Notably, each of these phases may be performed independently, by different entities.

The creation of the multi-classification model in block 201 begins by augmenting a training dataset in block 202. This augmentation will be described in greater detail below, but may include processing images in a preexisting training dataset to add versions of the images that include artificially generated artifacts. Block 204 then uses the augmented dataset to train the multi-output slide classifier. The images of the training dataset may be split into image tiles, as a whole slide may be too big to be processed all at once. Each tile may then be input to the model, a process which may be performed for multiple tiles in parallel. The outputs of the classifier for the different tiles may be corralled and combined into a report for the whole slide. The different outputs of the classifier may produce, for example, cell identification information, tumor cell classification information, and artifact region information. Cell and tumor cell identification information may include locations within a given slide image for each cell and for each tumor cell, respectively. The artifact region information may include, for example, a boundary that identifies one or more regions of the slide image that include an artifact, and may furthermore include statistical information such as a percentage of the slide image that is occupied by the artifact region(s).

Diagnosis and treatment 205 includes scanning a tissue sample to generate a new slide image 206. The tissue sample may be collected by any appropriate means, and may be scanned using whole-slide scanner 104. Block 208 uses the slide image as input to the trained multi-classification model, which generates information about any cells, any tumor cells, and any artifact regions shown within the slide image. The artifact region information may include, for example, a value for each pixel of the slide image that provides a likelihood that the pixel belongs to an artifact. An artifact region may then be defined by applying a threshold, with sufficiently high-valued pixels being added to artifact regions.

Block 209 performs analysis on the classified images, for example determining TCR values. The analysis 209 may exclude artifact regions from consideration, so that cell and tumor cell information within those regions does not affect the analysis. Block 210 performs treatment based on the output of the multi-classification model, for example by requesting further tests such as genetic tests, administering chemotherapeutic agents or performing surgery.

Figure 3:
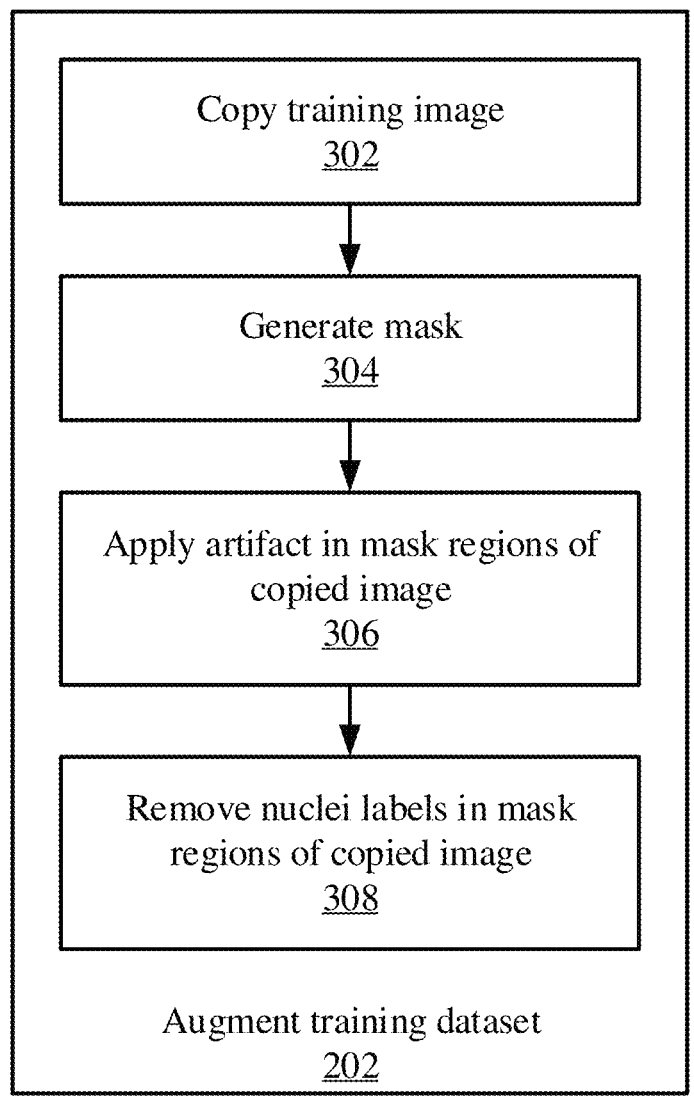
FIG. 3 is a block/flow diagram of a method for augmenting a training dataset to have training samples that include artifacts, in accordance with an embodiment of the present invention.

Referring now to FIG. 3, a method for augmenting a training dataset is shown. Block 302 copies a training image from an original training dataset. Block 304 generates a mask, which defines artifact areas within the copied image. The mask may identify random portions of the image in one or more discrete areas.

Block 306 applies an artifact in the masked regions of the copied image. For example, applying the artifact may include convolving a Gaussian kernel with the image to add synthetic blur, while ink can be simulated by applying a combination of blur and color shift. Target maps for each artifact, which may be understood as the equivalent of labels in a fully convolutional model, may be used to compute the loss. The loss may be a mean-squared error, for example, obtained by averaging the square of the difference for each pixel of the output and the target. Block 308 then removes labels for nuclei within the masked region(s), so that nuclei are not detected in areas with artifacts.

Figure 4:
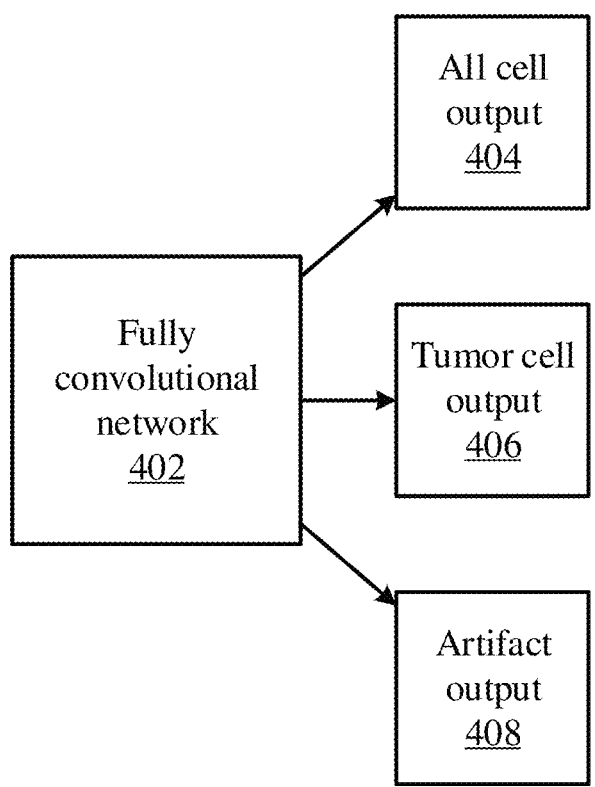
FIG. 4 is a block diagram of a neural network model that has different output layers for different respective functions, in accordance with an embodiment of the present invention.

Referring now to FIG. 4, a block diagram of a neural network model is shown. The model may be based on any appropriate fully convolutional network, taking inputs of any appropriate size and producing one or more output maps of the same size. The same fully convolutional network 402 can be used for different output layers, according to the information being extracted from the input image. Thus, the model may include an all-cell output layer 404, a tumor-cell output layer 406, and an artifact area output layer 408.

When training the model, a loss function may be optimized that weights each of the outputs. For example, the loss function may be represented as:

$$L_{total} = aL(\text{output1}, \text{target1}) + bL(\text{output2}, \text{target2}) + cL(\text{output3}, \text{target3})$$

where the function L(.,.) may be a loss function, such as the mean-squared error or binary cross entropy, and a, b, and c are weights given to the all-cell task, the tumor-cell task, and the artifact segmentation task. In each case, the output and target values reflect outputs of the respective tasks with respective expected values.

Figure 5:
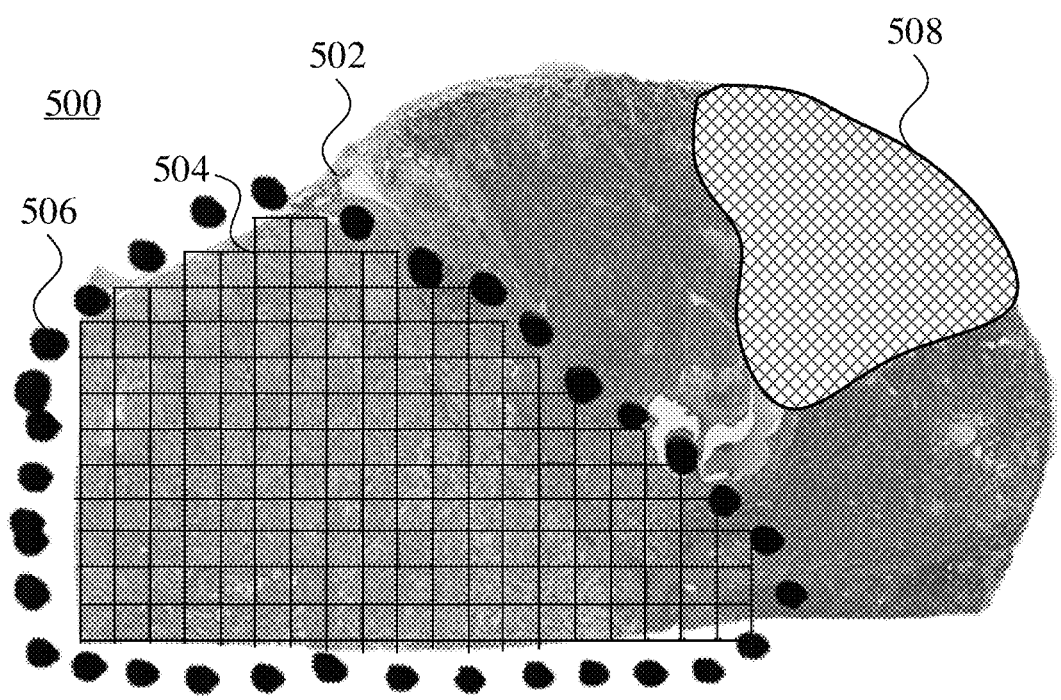
FIG. 5 is a diagram that shows analysis of a slide image that includes an artifact region, in accordance with an embodiment of the present invention.

Referring now to FIG. 5, an exemplary slide image 500 is shown after the identification of artifact areas in block 208. The slide image 500 includes the scanned tissue sample 502. In this example, a number of tiles 504 have been identified within the image, in this case by applying a grid over the scanned tissue image 502, with pixels falling within each respective grid making up a respective tile. A set of markers 506 are also shown, having been provided by a human operator, to limit the tiles, such that tiles 504 are only determined within a boundary that is established by the markers 506. In some examples, the TCR analysis and other analyses may be limited to the marked area.

Additionally, an artifact region 508 is indicated. Cell information is not considered in the artifact region, independent of any regions marked by the human operator. Thus, if the marked region includes all or part of an artifact region, any cells present within the artifact region(s) will not be counted toward the analysis.

Figure 6:
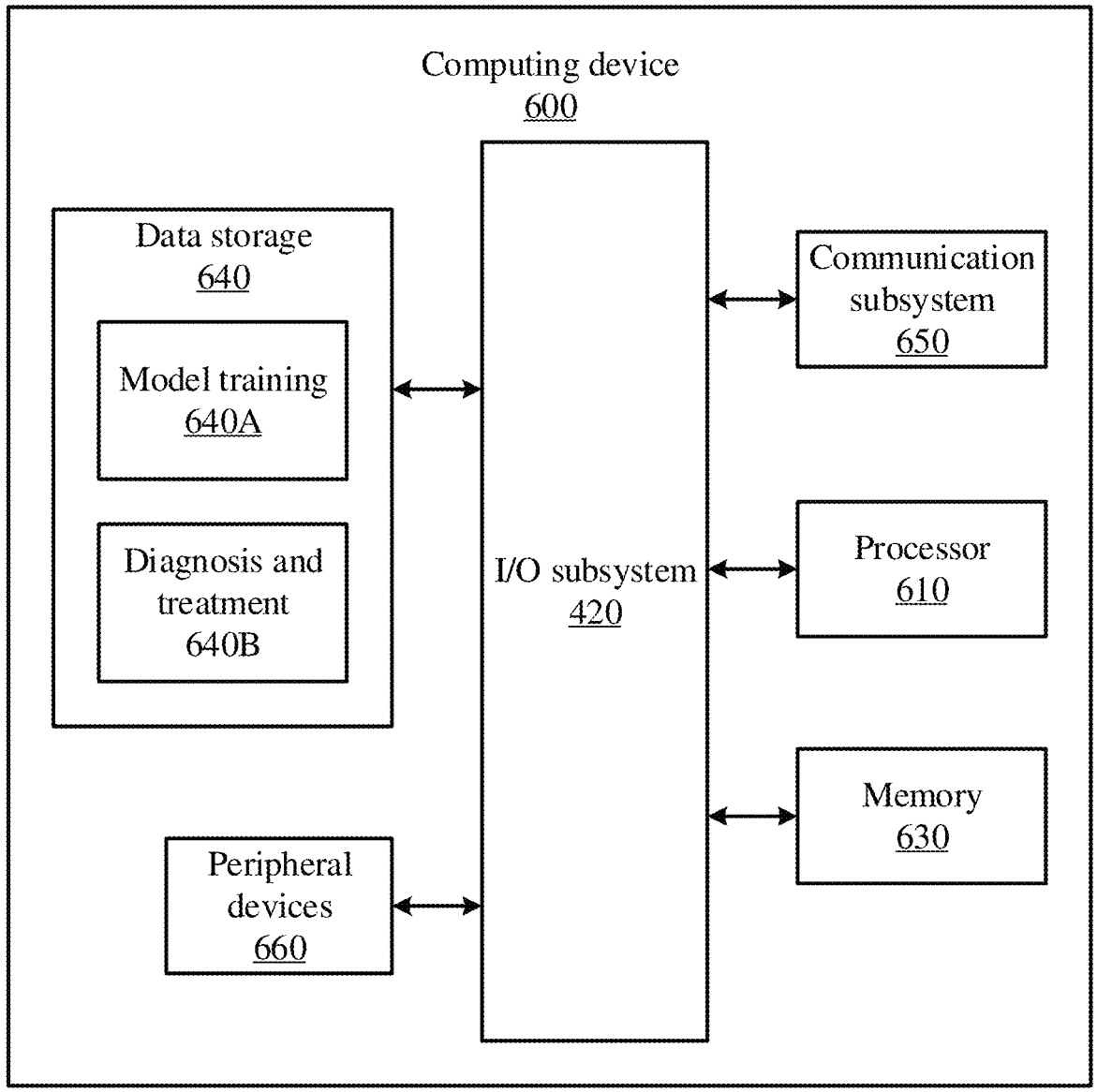
FIG. 6 is a block diagram of a computing device that includes software to train a model and to perform diagnosis and treatment using artifact detection for slide images, in accordance with an embodiment of the present invention.

Referring now to FIG. 6, an exemplary computing device 600 is shown, in accordance with an embodiment of the present invention. The computing device 600 is configured to perform classifier enhancement.

The computing device 600 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 600 may be embodied as a one or more compute sleds, memory sleds, or other racks, sleds, computing chassis, or other components of a physically disaggregated computing device.

As shown in FIG. 6, the computing device 600 illustratively includes the processor 610, an input/output subsystem 620, a memory 630, a data storage device 640, and a communication subsystem 650, and/or other components and devices commonly found in a server or similar computing device. The computing device 600 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 630, or portions thereof, may be incorporated in the processor 610 in some embodiments.

The processor 610 may be embodied as any type of processor capable of performing the functions described herein. The processor 610 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 630 may be embodied as any type of volatile or non-volatile memory or data storage capable of performing the functions described herein. In operation, the memory 630 may store various data and software used during operation of the computing device 600, such as operating systems, applications, programs, libraries, and drivers. The memory 630 is communicatively coupled to the processor 610 via the I/O subsystem 620, which may be embodied as circuitry and/or components to facilitate input/output operations with the processor 610, the memory 630, and other components of the computing device 600. For example, the I/O subsystem 620 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 620 may form a portion of a system-on-a-chip (SOC) and be incorporated, along with the processor 610, the memory 630, and other components of the computing device 600, on a single integrated circuit chip.

The data storage device 640 may be embodied as any type of device or devices configured for short-term or long-term storage of data such as, for example, memory devices and circuits, memory cards, hard disk drives, solid state drives, or other data storage devices. The data storage device 640 can store program code 640A for training a mutation policy model and program code 640B for mutating peptide sequences according to a mutation policy model. The communication subsystem 650 of the computing device 600 may be embodied as any network interface controller or other communication circuit, device, or collection thereof, capable of enabling communications between the computing device 600 and other remote devices over a network. The communication subsystem 650 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 600 may also include one or more peripheral devices 660. The peripheral devices 660 may include any number of additional input/output devices, interface devices, and/or other peripheral devices. For example, in some embodiments, the peripheral devices 660 may include a display, touch screen, graphics circuitry, keyboard, mouse, speaker system, microphone, network interface, and/or other input/output devices, interface devices, and/or peripheral devices.

Of course, the computing device 600 may also include other elements (not shown), as readily contemplated by one of skill in the art, as well as omit certain elements. For example, various other sensors, input devices, and/or output devices can be included in computing device 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 600 are readily contemplated by one of ordinary skill in the art given the teachings of the present invention provided herein.

Figure 7:
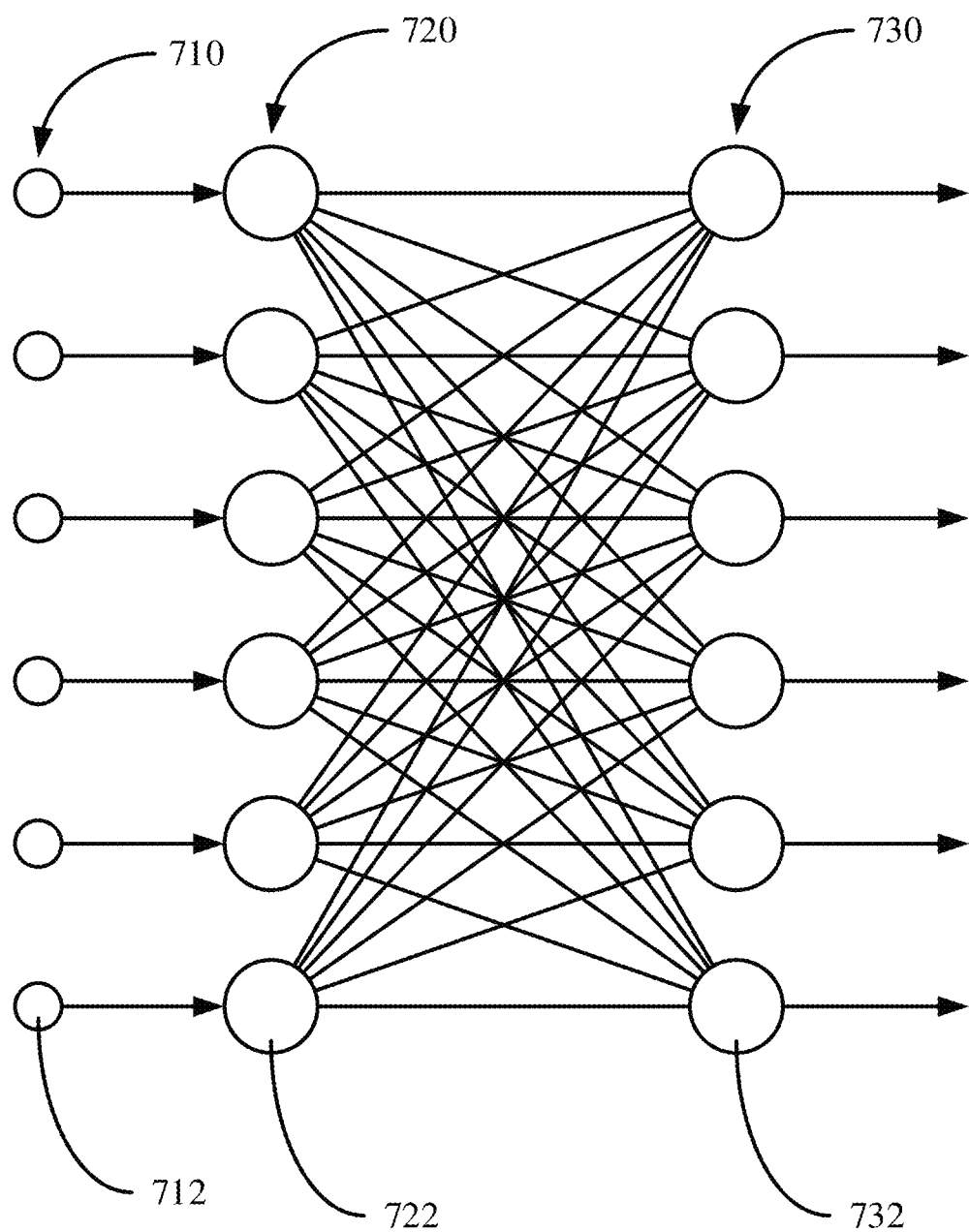
FIG. 7 is a diagram of a neural network architecture that can be used to implement part of the model, in accordance with an embodiment of the present invention.
Figure 8:
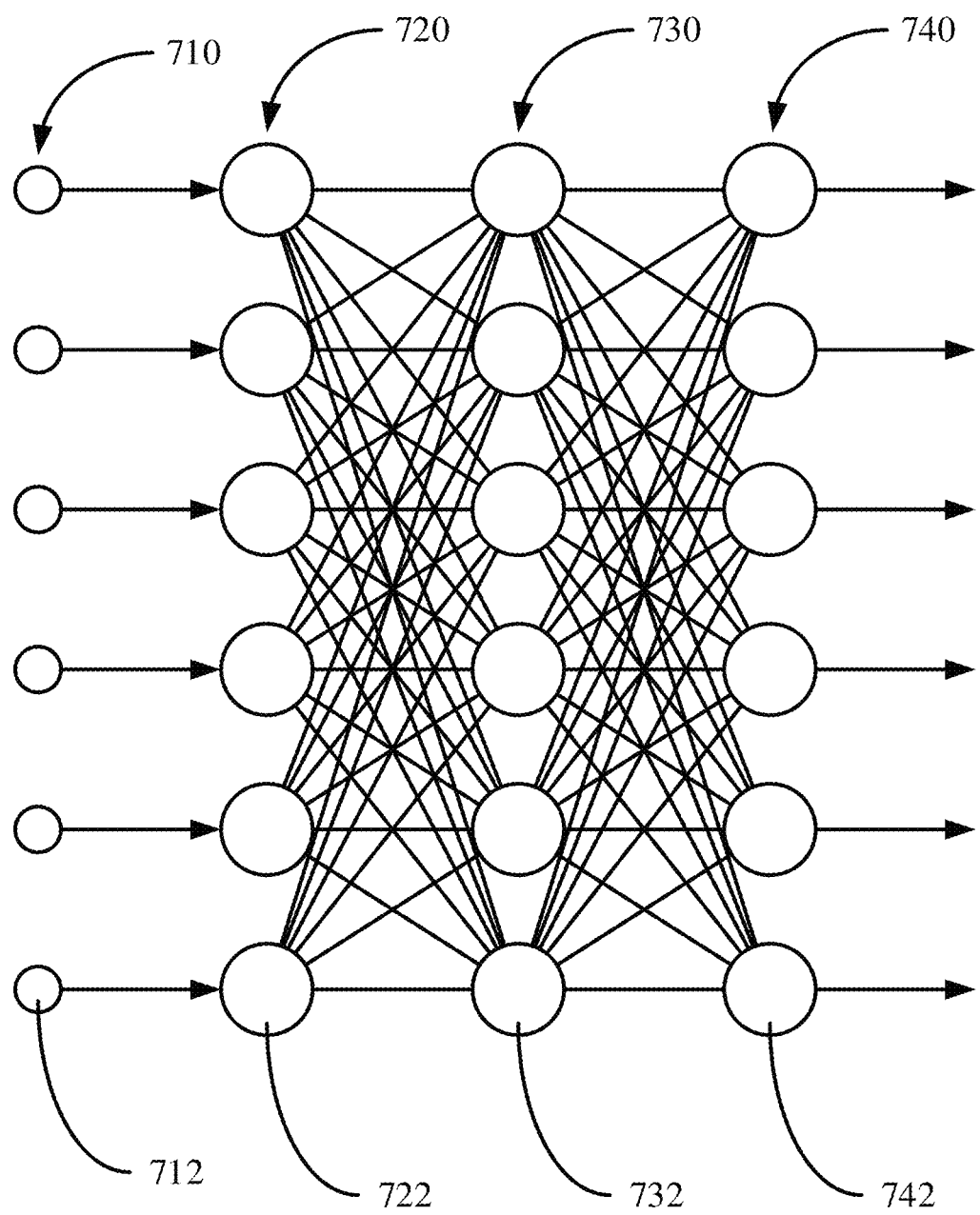
FIG. 8 is a diagram of a deep neural network architecture that can be used to implement part of the model, in accordance with an embodiment of the present invention.

Referring now to FIGS. 7 and 8, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for training a neural network model, comprising:
   augmenting an original training dataset to generate an augmented training dataset, by applying an image artifact to a portion of an original image of the original dataset to generate an artifact image;
   generating a target image corresponding to the artifact image by deleting object labels from the target image at the position of the artifact; and
   training a neural network model using the augmented training dataset and the corresponding target image, the neural network model including a first output that identifies artifact regions and other outputs identifying objects.

2. The method of claim 1, wherein applying the image artifact includes determining a mask that identifies a region of the original image where the image artifact will be applied.

3. The method of claim 2, wherein applying the image artifact further includes convolving the image in the identified region with a Gaussian kernel to add a blur.

4. The method of claim 3, wherein applying the image artifact further includes applying a color shift in the identified region to simulate ink.

5. The method of claim 2, wherein determining a mask includes generating a random number of areas, each of the random number of areas having a randomly generated shape.

6. The method of claim 1, wherein training the neural network model includes minimizing a loss function that includes a weighted sum of a loss term from the first output and respective loss terms from other outputs identifying objects.

7. The method of claim 1, wherein the neural network model is a fully convolutional neural network model with output maps.

8. The method of claim 7, wherein the first output of the fully convolutional neural network model is a map and the target image represents a mask of the image artifact, and wherein generating the target image includes deleting labels of objects within the artifact mask.

9. A system for training a neural network model, comprising:
   a hardware processor; and
   a memory that stores a computer program, which, when executed by the hardware processor, causes the hardware processor to:
      augment an original training dataset to generate an augmented training dataset, by applying an image artifact to a portion of an original image of the original dataset to generate an artifact image;

generate a target image corresponding to the artifact image by deleting labels from the target image at the position of the artifact; and train a neural network model using the augmented training dataset and the corresponding target image, the neural network model including a first output that identifies artifact regions and other outputs identifying objects.

10. The system of claim 9, wherein the computer program further causes the hardware processor to determine a mask that identifies a region of the original image where the image artifact will be applied.

11. The system of claim 10, wherein the computer program further causes the hardware processor to convolve the image in the identified region with a Gaussian kernel to add blur.

12. The system of claim 11, wherein the computer program further causes the hardware processor to apply a color shift in the identified region to simulate ink.

13. The system of claim 10, wherein the computer program further causes the hardware processor to generate a random number of areas for the mask, each of the random number of areas having a randomly generated shape.

14. The system of claim 9, wherein the computer program further causes the hardware processor to minimize a loss function that includes a weighted sum of a loss term from the first output and respective loss terms from other outputs identifying objects.

15. The system of claim 9, wherein the neural network model is a fully convolutional neural network model with output maps.

16. The system of claim 15, wherein the first output of the fully convolutional neural network model is a map and the target image represents a mask of the image artifact, and wherein the computer program further causes the hardware processor to delete labels of objects within the artifact mask.

* * * * *